(12) United States Patent
Nishi et al.

(10) Patent No.: US 7,856,172 B2
(45) Date of Patent: Dec. 21, 2010

(54) JIGGLE MEASURING SYSTEM AND JIGGLE MEASURING METHOD

(75) Inventors: Kazuki Nishi, Tokyo (JP); Masaya Oita, Osaka (JP); Yasuo Masaki, Osaka (JP)

(73) Assignees: The University of Electro-Communications, Tokyo (JP); Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/520,472

(22) PCT Filed: Dec. 10, 2007

(86) PCT No.: PCT/JP2007/073788

§ 371 (c)(1),
(2), (4) Date: Jun. 19, 2009

(87) PCT Pub. No.: WO2008/078537

PCT Pub. Date: Jul. 3, 2008

(65) Prior Publication Data

US 2010/0014846 A1    Jan. 21, 2010

(30) Foreign Application Priority Data

Dec. 22, 2006 (JP) .............................. 2006-345239

(51) Int. Cl.
*G03B 17/00* (2006.01)
*H04N 5/228* (2006.01)

(52) U.S. Cl. .................................. 396/52; 348/208.99
(58) Field of Classification Search .................. 396/52; 348/208.99
See application file for complete search history.

(56) References Cited

U.S. PATENT DOCUMENTS 5,813,771 A * 9/1998 Ur et al. ........................ 400/74
5,926,212 A * 7/1999 Kondo ..................... 348/207.99
2007/0014554 A1* 1/2007 Sasaki et al. .................... 396/55

FOREIGN PATENT DOCUMENTS

| JP | 6-051364 | 2/1994 |
| JP | 3143527 | 2/1994 |
| JP | 10-023322 | 1/1998 |
| JP | 2002-142146 A | 5/2002 |
| JP | 2002-195815 A | 7/2002 |
| JP | 2004-080664 A | 3/2004 |
| JP | 2005-173507 A | 6/2005 |

OTHER PUBLICATIONS

Patent Abstracts of Japan, Publication No. 06-051364, dated Feb. 25, 1994, 1 page.
Patent Abstracts of Japan, Publication No. 10-023322, dated Jan. 23, 1998, 1 page.
International Search Report issued in PCT/JP2007/073788, mailed on Mar. 11, 2008, w/translation, 2 pages.

* cited by examiner

*Primary Examiner*—Rodney E Fuller
(74) *Attorney, Agent, or Firm*—Osha Liang LLP

(57) ABSTRACT

A camera shake measurement system includes a display unit for sequentially displaying a plurality of distinguishable test patterns, a first storage unit for storing as a template each of the plurality of test patterns to be displayed, a second storage unit for storing a composite image produced by photographing at least two test patterns as still images from the plurality of test patterns to be sequentially displayed by a photographing apparatus, and a pattern recognition unit for recognizing images that match each of the templates from the composite image by calling the templates from the first storage unit, calling the composite image from the second storage unit, and moving, for each of the called templates, the template while superposing the template on the composite image.

12 Claims, 12 Drawing Sheets

| PATTERN No. | GIVEN VERT. SHIFT [pixels] | EXTRACTED VERT. SHIFT [pixels] | GIVEN HOR. SHIFT [pixels] | EXTRACTED HOR. SHIFT [pixels] | GIVEN ROT. SHIFT (degree) | EXTRACTED ROT. SHIFT (degree) |
|---|---|---|---|---|---|---|
| 1 | −5 | −5.08 | 2 | 1.89 | −0.25 | −0.25 |
| 2 | −7 | −7.13 | 3 | 2.95 | −0.10 | −0.07 |
| 3 | −4 | −4.11 | 1 | 0.98 | 0.15 | 0.13 |
| 4 | −2 | −2.12 | −3 | −3.03 | 0.30 | 0.30 |
| 5 | −1 | −1.12 | −6 | −5.98 | 0.50 | 0.49 |
| 6 | 4 | 3.87 | −8 | −7.94 | 0.00 | 0.00 |

FIG. 9

OFF

| EXAMINEE | Pitch AVG (degree) | Pitch STDV (degree) | Pan AVG (degree) | Pan STDV (degree) | Roll AVG (degree) | Roll STDV (degree) | SAMPLE NUMBER |
|---|---|---|---|---|---|---|---|
| A | 0.018 | 0.014 | 0.016 | 0.013 | 0.05 | 0.04 | 330 |
| B | 0.025 | 0.020 | 0.022 | 0.018 | 0.05 | 0.05 | 192 |
| C | 0.026 | 0.021 | 0.033 | 0.025 | 0.05 | 0.04 | 174 |
| D | 0.019 | 0.016 | 0.025 | 0.018 | 0.09 | 0.07 | 138 |
| E | 0.029 | 0.024 | 0.036 | 0.027 | 0.07 | 0.06 | 84 |
| F | 0.022 | 0.018 | 0.026 | 0.021 | 0.05 | 0.04 | 234 |
| G | 0.014 | 0.013 | 0.017 | 0.015 | 0.05 | 0.04 | 216 |

ON

| EXAMINEE | Pitch AVG (degree) | Pitch STDV (degree) | Pan AVG (degree) | Pan STDV (degree) | Roll AVG (degree) | Roll STDV (degree) | SAMPLE NUMBER |
|---|---|---|---|---|---|---|---|
| A | 0.006 | 0.007 | 0.005 | 0.005 | 0.04 | 0.04 | 372 |
| B | 0.012 | 0.011 | 0.010 | 0.009 | 0.04 | 0.04 | 228 |
| C | 0.015 | 0.017 | 0.019 | 0.020 | 0.05 | 0.04 | 156 |
| D | 0.014 | 0.015 | 0.006 | 0.005 | 0.05 | 0.05 | 210 |
| E | 0.010 | 0.009 | 0.010 | 0.010 | 0.05 | 0.08 | 150 |
| F | 0.008 | 0.008 | 0.009 | 0.007 | 0.05 | 0.05 | 204 |
| G | 0.007 | 0.006 | 0.007 | 0.008 | 0.04 | 0.03 | 216 |

OFF

| EXAMINEE | Pitch-Pan TRAJ. AVG (degree) | Pitch-Pan TRAJ. STDV (degree) | Pitch-Pan-Rol TRAJ. AVG (degree) | Pitch-Pan-Rol TRAJ. STDV (degree) | SAMPLE NUMBER |
|---|---|---|---|---|---|
| A | 0.14 | 0.05 | 0.34 | 0.09 | 55 |
| B | 0.19 | 0.07 | 0.34 | 0.13 | 32 |
| C | 0.24 | 0.10 | 0.40 | 0.07 | 29 |
| D | 0.18 | 0.06 | 0.53 | 0.22 | 23 |
| E | 0.26 | 0.07 | 0.48 | 0.12 | 14 |
| F | 0.20 | 0.07 | 0.36 | 0.11 | 39 |
| G | 0.13 | 0.07 | 0.32 | 0.12 | 36 |

ON

| EXAMINEE | Pitch-Pan TRAJ. AVG (degree) | Pitch-Pan TRAJ. STDV (degree) | Pitch-Pan-Rol TRAJ. AVG (degree) | Pitch-Pan-Rol TRAJ. STDV (degree) | SAMPLE NUMBER |
|---|---|---|---|---|---|
| A | 0.05 | 0.03 | 0.22 | 0.10 | 62 |
| B | 0.09 | 0.05 | 0.23 | 0.12 | 38 |
| C | 0.14 | 0.07 | 0.33 | 0.12 | 26 |
| D | 0.08 | 0.05 | 0.30 | 0.13 | 35 |
| E | 0.08 | 0.05 | 0.29 | 0.21 | 25 |
| F | 0.07 | 0.03 | 0.28 | 0.14 | 34 |
| G | 0.06 | 0.03 | 0.22 | 0.10 | 36 |

FIG. 10

OFF

| CAMERA | Pitch AVG (degree) | Pitch STDV (degree) | Pan AVG (degree) | Pan STDV (degree) | Roll AVG (degree) | Roll STDV (degree) | SAMPLE NUMBER |
|---|---|---|---|---|---|---|---|
| A | 0.018 | 0.014 | 0.016 | 0.013 | 0.05 | 0.04 | 330 |
| B | 0.011 | 0.009 | 0.014 | 0.011 | 0.07 | 0.07 | 264 |
| C | 0.014 | 0.012 | 0.012 | 0.010 | 0.06 | 0.05 | 132 |

ON

| CAMERA | Pitch AVG (degree) | Pitch STDV (degree) | Pan AVG (degree) | Pan STDV (degree) | Roll AVG (degree) | Roll STDV (degree) | SAMPLE NUMBER |
|---|---|---|---|---|---|---|---|
| A | 0.006 | 0.007 | 0.005 | 0.005 | 0.04 | 0.04 | 372 |
| B | 0.003 | 0.002 | 0.002 | 0.003 | 0.08 | 0.14 | 234 |
| C | 0.007 | 0.007 | 0.006 | 0.006 | 0.04 | 0.03 | 84 |

OFF

| CAMERA | Pitch-Pan TRAJ. AVG (degree) | Pitch-Pan TRAJ. STDV (degree) | Pitch-Pan-Rol TRAJ. AVG (degree) | Pitch-Pan-Rol TRAJ. STDV (degree) | SAMPLE NUMBER |
|---|---|---|---|---|---|
| A | 0.14 | 0.05 | 0.34 | 0.09 | 55 |
| B | 0.10 | 0.03 | 0.41 | 0.19 | 44 |
| C | 0.11 | 0.04 | 0.34 | 0.14 | 22 |

ON

| CAMERA | Pitch-Pan TRAJ. AVG (degree) | Pitch-Pan TRAJ. STDV (degree) | Pitch-Pan-Rol TRAJ. AVG (degree) | Pitch-Pan-Rol TRAJ. STDV (degree) | SAMPLE NUMBER |
|---|---|---|---|---|---|
| A | 0.05 | 0.03 | 0.22 | 0.10 | 62 |
| B | 0.02 | 0.01 | 0.41 | 0.36 | 39 |
| C | 0.05 | 0.03 | 0.22 | 0.05 | 14 |

JIGGLE MEASURING SYSTEM AND JIGGLE MEASURING METHOD

TECHNICAL FIELD OF THE INVENTION

The present invention relates to a camera shake measurement system that measures camera shakes of photographing apparatuses such as a digital camera and other optical apparatuses and a method for measuring camera shakes.

BACKGROUND OF THE INVENTION

Camera shake correction apparatuses provided in conventional digital cameras calculate a camera shake amount by integrating acceleration detected by a gyro sensor and displaces a lens, an apex-angle prism, an image device, or the like, so as to compensate this camera shake amount.

The invention disclosed in Japanese Patent No. 3143527, as one example of such camera shake correction apparatuses, comprises apex-angle sensors (43, 44 (gyro sensor, or the like)) that detect camera shakes, a variable apex-angle prism (41) that is deformable to change a light axis, actuators (48, 49) that deform the variable apex-angle prism (41), a control circuit that applies driving voltage to the actuator, and the like.

The invention deforms the variable apex-angle prism (41) to change the light axis via the actuators (48, 49) according to the signals detected by the apex-angle sensors (43, 44).

Furthermore, Japanese Patent No. 3143527 comprises a light receiving means (8 (two-dimensional position sensor)) for detecting a light axis variation angle, a circuit that detects the output signals of the apex-angle sensors (43, 44), and the like, and discloses the invention for evaluating the performance of a camera shake correction apparatus from the relationship between the driving voltage and the light axis variation angle, the relationship between apex-angle detection sensor output and the light axis variation angle, and the like.

So it can be considered that the camera shake of a commercially-available digital camera is evaluated using this invention. In this case, however, it is necessary to add a means for detecting the above light axis variation angle to the digital camera itself or connect the former to the digital camera. So the evaluation is distant because it is difficult to apply the invention to camera shake measurement of an optional digital camera.

Moreover, in the above case, detectable camera shake directions are limited depending on the direction in which a gyro sensor is installed, and it is further difficult to observe time-series changes of a camera shake direction and a camera shake amount.

By the way, in general, camera shakes that occur when a subject is photographed with a still camera are classified into three types: a camera shake that serves as rotational movement around a pan axis (vertical axis), a camera shake that serves as rotational movement around a pitch axis (horizontal axis), and a camera shake that serves as rotational movement around a roll axis (axis perpendicular to both the pan axis and the pitch axis). The pitch axis may also be referred to as a tilt axis.

These three types of camera shakes are considered to differ, depending on various conditions such as a shutter button location, a camera shape, whether a user is male or female, and whether the user is professional or amateur.

The camera shake correction functions of typical commercially-available digital cameras detected and corrected only the camera shake amounts around the pitch axis and pan axis but did not detect and correct camera shakes around the roll axis (light axis) (for example, see FIG. 9 in Japanese Patent No. 3143527).

This is because detection of camera shakes around the roll axis requires that a gyro sensor be installed in the digital camera thickness direction and this installation contributes to the hindering of smaller digital cameras and lower cost.

Therefore, only light axis variation angles around the pitch axis and pan axis are obtained even if a means for detecting a light axis variation angle in Japanese Patent No. 3143527 is connected to a conventional digital camera. It is difficult to detect triaxial rotational movement that is an actual camera shake phenomenon.

Also, the camera shake correction measurement apparatus described in Japanese Patent Application KOKAI Publication No. 2002-195815 is available, for example, as other pertinent art. This conventional art is configured to pass the laser beam (L) projected from a light source (101) through an optical system (103) having a camera shake correction function, projecting the laser beam to a scale (106), and measuring the moving amount of an image on the projected scale, thereby evaluating the performance of said camera shake correction function.

Even this conventional art can obtain only a single point to be projected to the scale (106) or a rectilinear-trajectory on a two-dimensional surface. It could not detect triaxial rotational movement corresponding to the actual camera shake phenomenon and time-series changes of a camera shake direction and a camera shake amount.

In addition, the camera shake correction method and image monitoring system described in Japanese Patent Application KOKAI Publication No. 10-23322, for example, as other pertinent art, define one of the two frames in images photographed by a surveillance camera as a reference image and the other as a processed image and correct image shifts by performing pattern matching for the processed image using a template pattern created from the reference image, selecting a specific matching region using the regularity of image shifts resulting from camera shake, and calculating a camera shake amount from the moving vector thereof.

However, this conventional art uses any single image photographed by the surveillance camera as the reference image, and performs pattern matching for the processed image using the template pattern created from the reference image. In such a configuration, only rectilinear-trajectory on a two-dimensional surface is obtained as the camera shake amount, so this conventional art could not detect triaxial rotational movement corresponding to the camera shake phenomenon of the still camera and time-series changes of a camera shake direction and a camera shake amount, like the inventions described in other patent literatures.

SUMMARY OF THE INVENTION

The present invention has been made in view of the above conventional conditions and an object thereof is to provide a camera shake measurement system and a method for measuring camera shakes that make it possible to detect camera shake variations of a photographing apparatus without installing an additional device on an optional photographing apparatus and can further detect camera shakes around the three axes of the photographing apparatus.

A technical means for solving the above problems comprises a display means for sequentially displaying a plurality of distinguishable test patterns, a first storage means for storing as templates said plurality of test patterns to be displayed, respectively, a second storage means for storing a composite image produced by photographing at least two test patterns as still images from said plurality of test patterns to be sequentially displayed by a photographing apparatus, and a pattern recognition means for recognizing images, from the composite image, that match each of the templates by calling said plurality of templates from said first storage means, calling said composite image from said second storage means, and moving, for each of the called templates, the template while superposing the template on said composite image, wherein a moving direction and a moving amount of each of the templates by the pattern recognition means are defined as a camera shake direction and a camera shake amount of said photographing apparatus when said still image is photographed and at least two sets of the camera shake direction and the camera shake amount are obtained.

The above "a plurality of distinguishable test patterns" may have a configuration in which one test pattern can be distinguished from another in a plurality of test patterns.

Therefore, this "a plurality of distinguishable test patterns" includes a configuration in which one test pattern differs from another test pattern regarding color, shape, position, angle, pattern, or a combination thereof, or the like.

That is, the functions of the above plurality of test patterns can be handled similarly (the plurality of test patterns can be handled as different patterns) if their colors, shapes, locations, angles, patterns, a combination thereof, or the like differ, although the figure contours themselves are of the same type.

The above photographing apparatus may be one that can record a still image and include typical still cameras, digital cameras, and the like.

In addition, the photographing apparatuses includes a typical digital video camera. That is, in the digital video camera, one frame image is a still image.

Also, the above template means the state in which image data of each of the above test patterns is stored in the above first storage means.

Also, the above pattern recognition means includes, for example, a configuration in which well-known image processing such as pattern matching processing or template matching processing is performed.

According to the above technical means, of the test patterns to be sequentially displayed, one photographed image produced by photographing at least two test patterns of test patterns sequentially displayed by the photographing apparatus as still images serves as a composite image where camera shakes of the photographing apparatus are reflected as change information of a plurality of test patterns.

When an image that matches each template is pattern-recognized from this composite image, the moving direction and moving amount of each template are detected. That is, it is detected in which direction and how much each of the sequentially displayed test patterns has moved on the composite image.

The moving direction and moving amount detected for each template correspond to the camera shake direction and camera shake amount of the photographing apparatus when the above still image is photographed.

Obtaining at least two sets of the moving directions and moving amounts enables a user to know how the camera shake direction and the camera shake amount of the photographing apparatus have changed.

Also, a further technical means is characterized in that each of the above plurality of test patterns is a figure having portions that are not substantially superposed on each other between test patterns.

Here, the above configuration "each of the plurality of test patterns has portions that are not substantially superposed on each other between test patterns" may take an aspect in which any test pattern is partly superposed on, and not superposed on the other parts of, other test patterns in the above plurality of test patterns. However, more preferably, the configuration takes an aspect in which any test pattern in the above plurality of test patterns is completely separated from the other test patterns.

In addition, "are not superposed on each other" can be represented as "mutually perpendicular" or "do not interfere with each other".

According to the technical means, an image that matches each template can be more easily pattern-recognized from a composite image.

In other words, any test pattern of a plurality of test patterns and the other test patterns have portions that do not at least superpose with each other. Therefore, said other test patterns can be prevented from being recognized falsely when an image that matches the template corresponding to said any test pattern is pattern-recognized.

Also, in a further technical means, the above moving direction includes a vertical direction, a horizontal direction, and a rotational direction on a plane of said composite image. The further technical means is characterized in that the above moving amount is detected for each direction.

According to the technical means, the above moving amount is detected corresponding to each of the vertical direction, horizontal direction, and rotational direction.

Also, a further technical means is characterized in that the moving amount of the above vertical direction, the moving amount of the above horizontal direction, and the moving amount of the above rotational direction are converted respectively to a camera shake amount around a pitch axis, a camera shake amount around a pan axis, and a camera shake amount around a roll axis for the above photographing apparatus.

According to the technical means, each of the camera shake amounts around the three axes (pitch axis, pan axis, roll axis) in the photographing apparatus is detected. That is, the user can know the rotation direction in which the camera shake of the photographing apparatus actually has occurred.

Also, a further technical means is characterized in that the above three camera shake amounts are arranged in the display order of the above test patterns to calculate a camera shake trajectory.

According to the technical means, the above three rotation angles are arranged in time series to calculate a camera shake trajectory. Therefore, the user can know a trajectory in which the camera shake of the photographing apparatus has changed in time series.

Also, a further technical means is characterized in that each of the above test patterns comprises at least two figures to be planarly displayed.

Here, a preferable specific example of the above "at least two figures" is a multi-point figure such as a two-point figure, three-point figure, or a four or more-point figure.

A configuration in which a plurality of figures such as a line, a triangle, or a polygon is arranged can also be taken as another example of the configuration.

According to the technical means, processing for pattern-recognizing each test pattern from a composite image can be more easily performed. In particular, detection of the moving amount of the rotational direction in each test pattern can be made easy.

Also, another technical means is characterized in that the above moving direction and the above moving amount are arranged in the display order of the above test patterns to calculate a camera shake trajectory.

According to the technical means, simple processing such as arranging the moving direction and moving amount of each template in the template display order as they are makes it possible to represent a camera shake trajectory that changes in time series corresponding to a camera shake of the photographing apparatus.

Also, another technical means comprises, a first storage means for storing a plurality of distinguishable test patterns as templates, respectively, a second storage means for storing a composite image produced by photographing as still images at least two test patterns of the plurality of test patterns to be sequentially displayed by a photographing apparatus, and a pattern recognition means for recognizing an image, from said composite image, that matches each of said templates by calling said plurality of templates from said first storage means, calling said composite image from said second storage means, and moving, for each of said called templates, the template while superposing the template on said composite image, wherein a moving direction and a moving amount of each of said templates obtained by said pattern recognition means are defined as a camera shake direction and a camera shake amount of the photographing apparatus and at least two sets of the camera shake direction and the camera shake amount are obtained.

Also, a camera shake measurement method that is another technical means comprises a step in which a display means sequentially displays a plurality of distinguishable test patterns, a step in which a first storage means stores as templates the plurality of test patterns to be displayed, respectively, a step in which a second storage means stores a composite image produced by photographing at least two test patterns of said test patterns as still images by a photographing apparatus, and a step in which a pattern recognition means recognizes an image that matches said template from said composite image by calling said plurality of templates from said first storage means, calling said composite image from said second storage means, and moving, for each of said called templates, the template while superposing the template on said composite image, wherein a moving direction and a moving amount of each of said templates obtained by the pattern recognition means are defined as a camera shake direction and a camera shake amount of the photographing apparatus and obtains at least two sets of the camera shake direction and the camera shake amount are obtained.

The present invention is configured as described above, so it develops an operation and an effect such as described below.

According to the present invention, a photographing apparatus requires no special additional device and camera shakes of any photographing apparatus can be easily detected in an actual photographing environment regardless of a difference in a photographing apparatus or a user.

Moreover, change of camera shakes of a photographing apparatus can be detected from data comprising a plurality of moving directions and moving amounts.

In addition, a user can know how camera shakes around the three axes of a photographing apparatus have changed in time series by detecting a moving amount for each moving direction of each template to correspond to the triaxial camera shake direction of the photographing apparatus.

Also, a measurement resolution can be easily made variable by setting display intervals of a plurality of test patterns. That is, for example, if the display interval of test patterns is narrowed, the number of moving amount data pieces for each moving direction detected within a shutter speed (shutter opening time) of a photographing apparatus increases and the measurement resolution improves. If the display interval of the test patterns is widened, the measurement resolution decreases conversely.

Consequently, it is possible to compare camera shake degrees or camera shake correction performances regarding a plurality of photographing apparatuses and to grasp the tendency of camera shakes resulting from a difference in a shape of a photographing apparatus or from differences among individuals of users. It is also possible to help develop photographing apparatuses that strongly resist camera shakes by feeding back the evaluation of camera shakes as mentioned above and examining the position and shape of the shutter button, the shape of a main body of a photographing apparatus, or the function and structure of a camera shake correction apparatus.

BRIEF DESCRIPTION OF THE DRAWINGS

FIG. 9 is tables showing the relationship between differences in examinee and camera shake amounts about the data measured by the same camera shake measurement system, where an upper table shows data when the camera shake correction function of the photographing apparatus is OFF, while a lower table shows data when the camera shake correction function of the photographing apparatus is ON;

FIG. 10 is tables showing the relationship between differences in examinee and camera shake trajectory lengths about the data measured by the same camera shake measurement system, where an upper table shows data when the camera shake correction function of the photographing apparatus is OFF, while a lower table shows data when the camera shake correction function of the photographing apparatus is ON;

FIG. 11 is tables showing the relationship between differences in photographing apparatus model and camera shake amounts about the data detected by the same camera shake measurement system, where an upper table shows data when the camera shake correction function of the photographing apparatus is OFF, while a lower table shows data when the camera shake correction function of the photographing apparatus is ON; and FIG. 12 is tables showing the relationship between photographing apparatus models and camera shake trajectory lengths about the data measured by the same camera shake measurement system, where an upper table shows data when the camera shake correction function of the photographing apparatus is OFF, while a lower table shows data when the camera shake correction function of the photographing apparatus is ON.

DETAILED DESCRIPTION

Embodiments of the present invention will be described below with reference to the drawings.

Figure 1:
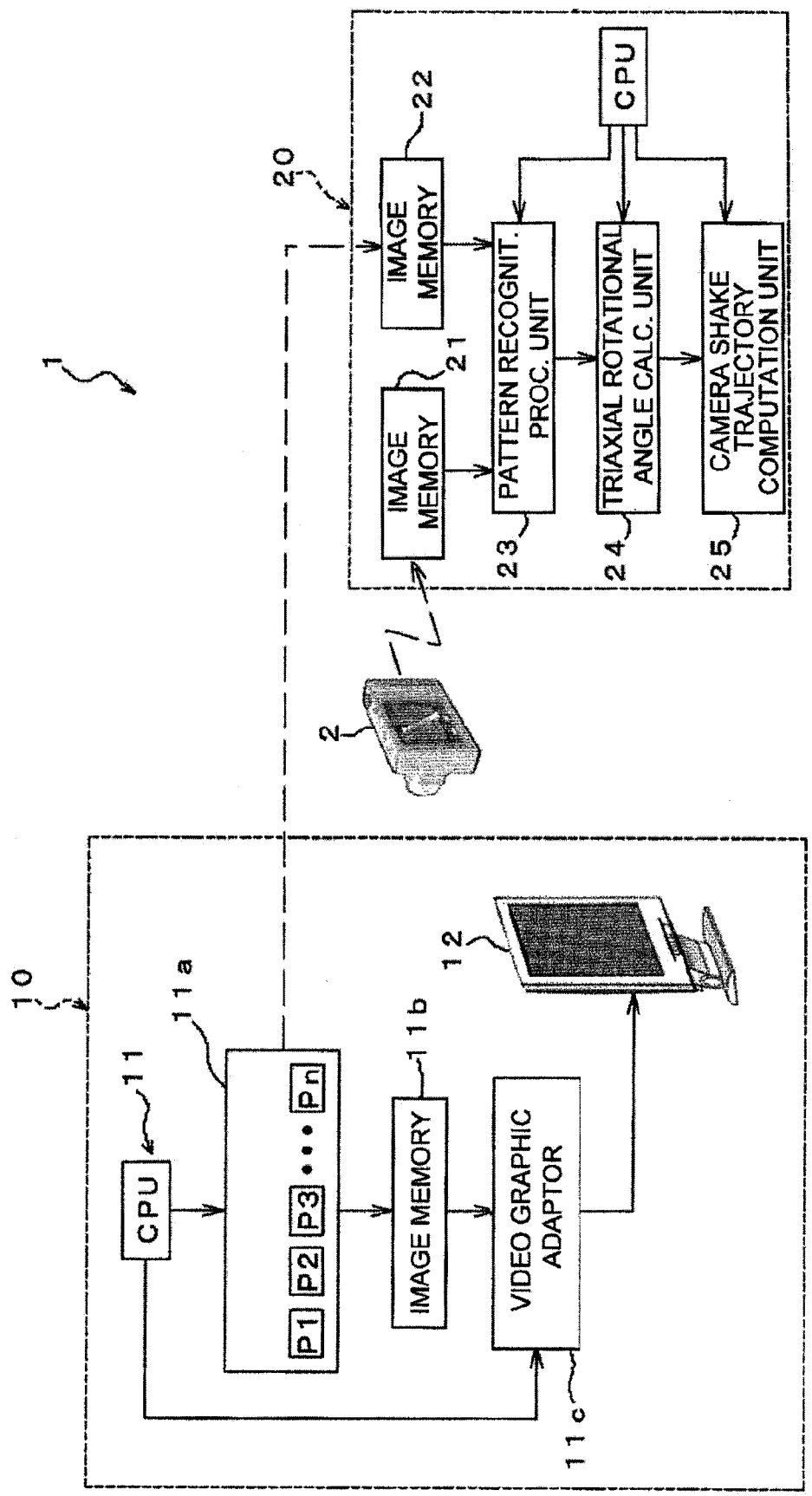
FIG. 1 is a block diagram showing one example of a camera shake measurement system according to the present invention.

FIG. 1 is a block diagram showing one example of a camera shake measurement system according to the present invention.

The camera shake measurement system 1 comprises a test pattern display unit 10 (display means) which sequentially displays a plurality of test patterns P1 to Pn different in kind and an arithmetic processing unit 20 which pattern-recognizes an images that match each of the test patterns P1 to Pn from a composite image d (see FIG. 2 and FIG. 3) produced by photographing at least two test patterns of the test patterns P1 to Pn by a photographing apparatus 2 as still images and detects a relative moving amount for each moving direction of each of the test patterns when the pattern recognition is performed.

The test pattern display unit 10 comprises a general computer 11 equipped with a CPU, a storage device, an input/output device, and the like, a program for operating the computer 11, and a display device 12 for displaying the processing result from the computer 11.

The computer 11 stores the test patterns P1 to Pn generated by a test pattern generator 11a in an image memory 11b together with the order data thereof and sequentially outputs the test patterns P1 to Pn stored in the image memory 11b via a video graphic adapter 11c (a so-called video card, or the like).

Figure 3:
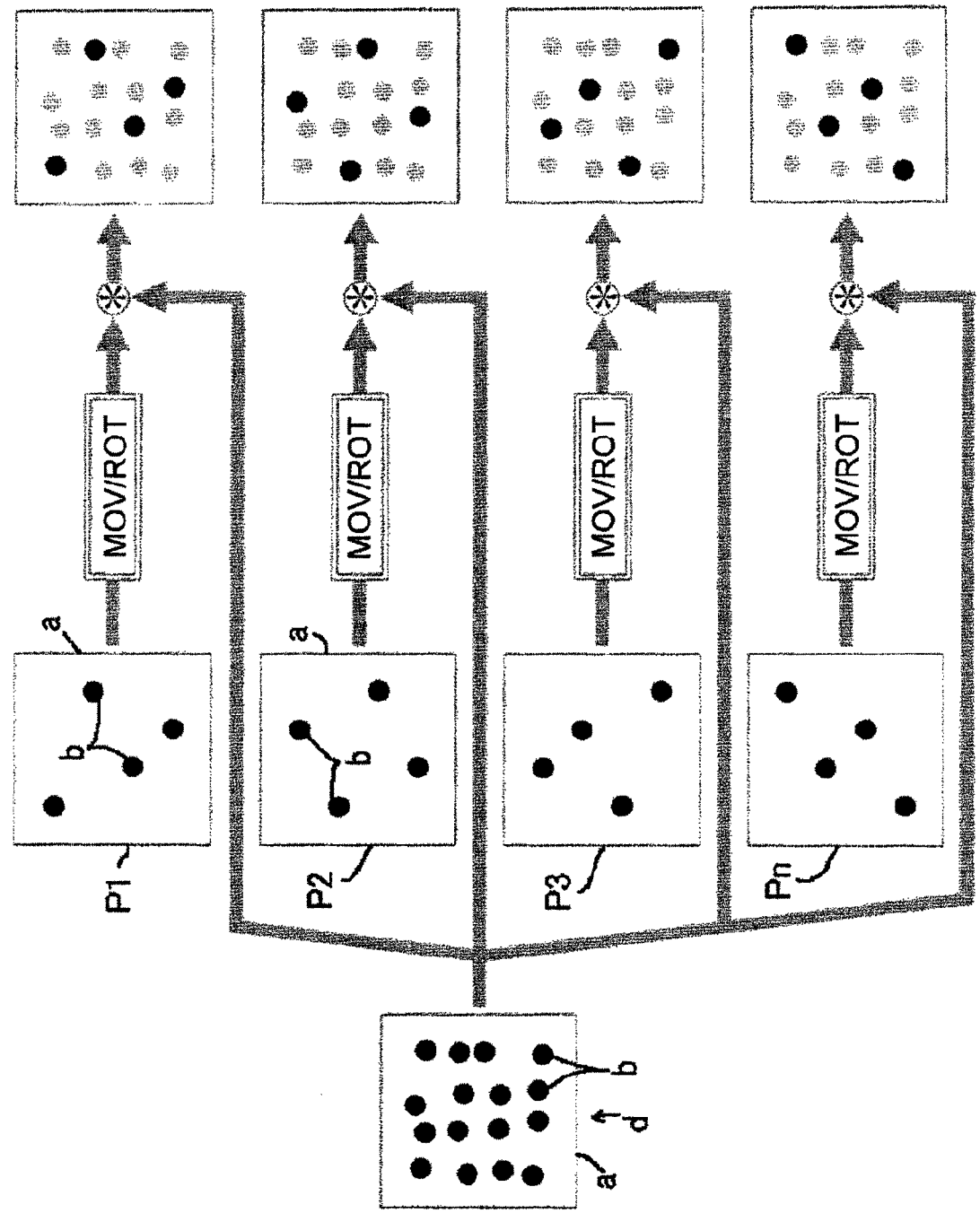
FIG. 3 is an illustration diagram showing a concept in which the same camera shake measurement system recognizes each test pattern from the photographed composite image.

The test pattern generator 11a is, for example, a program that generates the test patterns P1 to Pn shown in FIG. 3.

The test pattern generator 11a may be a program that calculates the locations of said many point figures b according to a calculating formula and sequentially generates and outputs test patterns P1 to Pn, or a program that sequentially outputs the test patterns P1 to Pn artificially created and stored in advance.

Each of test patterns P1 to Pn comprises at least two figures to be displayed on a plane. According to one preferred example shown in FIG. 3, each test pattern comprises an substantially square-shaped reference frame "a" displayed in the center on the screen of the display device 12 described later and many point figures "b" displayed in a scattered manner in the reference frame "a" on the screen of the display device 12.

The coordinate of each point figure b in any test pattern of the test patterns P1 to Pn is determined so as not to be superposed on many-point figures b in the other test patterns (that is, so that it becomes a different coordinate position).

Also, according to the illustrated example, the display device 12 is a display device for a computer that sequentially displays the test patterns P1 to Pn output via the video graphic adapter 11c on the screen.

Making the switching speed among the test patterns P1 to Pn faster than the shutter speed (shutter opening time) of the photographing apparatus 2 enables the photographing apparatus 2 to photograph at least two test patterns of the test patterns P1 to Pn as still images.

According to one preferred example of the embodiment, a moving image including each of the test patterns P1 to Pn as one frame is created and this moving image is displayed in the display device 12. Therefore, the switching speed among the test patterns P1 to Pn is a speed (ex., 1/60 seconds) determined from the frame rate (ex., 60 fps) of said moving image.

The number of test patterns P1 to Pn is greater than the number of test patterns that can be displayed within at least the maximum shutter speed (maximum shutter opening time) of the photographing apparatus 2.

Further preferably, the test patterns P1 to Pn are displayed in an infinite loop so as not to end the display of the test patterns P1 to Pn during the shutter opening time of the photographing apparatus 2.

As another example, it is also possible to display the test patterns P1 to Pn of the number less than said number of test patterns that can be displayed in an infinite loop.

Accordingly, images displayed in the display device 12 in a high-speed switching manner are visually recognized as one subject "c" (see FIG. 2) where a reference frame "a" and point figures "b" of a plurality of test patterns P1 to Pn are composed and produced.

Also, the photographing apparatus 2 is a commercially-available digital camera with a camera shake correction function.

The image obtained by photographing the above subject "c" using the photographing apparatus 2 serves as the composite image d (see FIG. 2 and FIG. 3) obtained by photographing at least two of the test patterns P1 to Pn within the shutter speed (shutter opening time) of the photographing apparatus 2.

Figure 2:
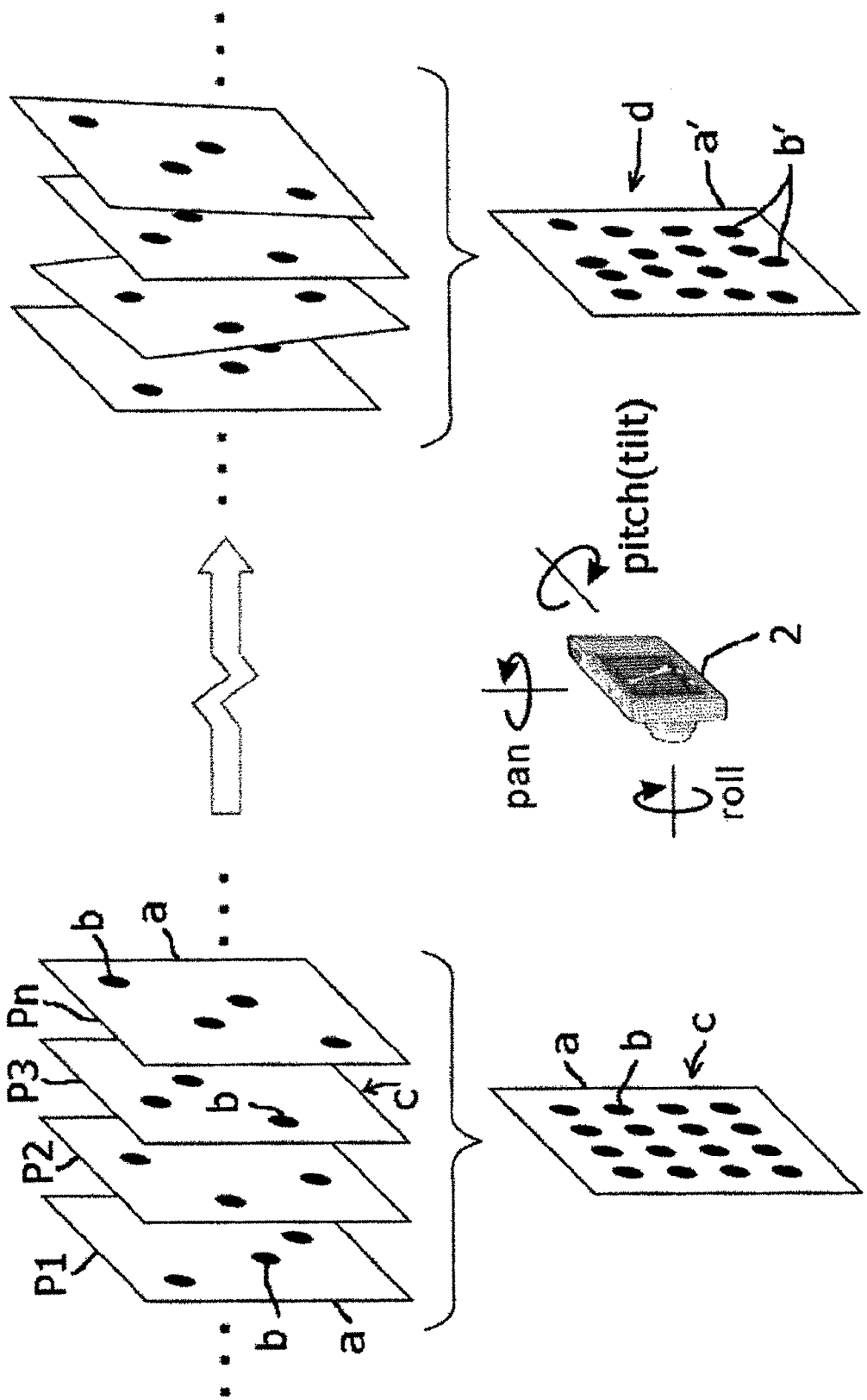
FIG. 2 is an illustration diagram showing a concept in which the same camera shake measurement system photographs test patterns to be sequentially displayed with a still image photographing apparatus to produce a composite image.

If the photographing apparatus 2 is held by a hand of an examinee when photographing is performed by the photographing apparatus 2, three types of camera shakes generally occur, as shown in FIG. 2: a camera shake that serves as rotational movement around a pan axis (vertical axis); a camera shake that serves as rotational movement around a pitch or tilt axis (horizontal axis); and a camera shake that serves as rotational movement around a roll axis (axis perpendicular to both the pan axis and the pitch axis).

Therefore, the reference frame "a" and the point figures "b" in the photographed test pattern of the test patterns P1 to Pn move slightly to the vertical, horizontal, and rotational directions due to camera shakes around the three axes of the photographing apparatus 2 and are produced on said composite image "d" as a reference frame a' and point figure b' as shown in FIG. 2.

Almost like the test pattern display unit 10, an arithmetic processing unit 20 also comprises a general computer equipped with a CPU, a storage device, an input/output device, and the like, and a program for operating the computer.

The arithmetic processing unit 20 comprises an image memory 21 (second storage means) which stores the composite image "d" photographed by the photographing apparatus 2, an image memory 22 (first storage means) which stores copies of the test patterns P1 to Pn transmitted from the test pattern display unit 10 together with display order information thereof as templates described later, a pattern recognition processing unit 23 (pattern recognition means) which performs processing such as pattern recognition for the composite image "d" stored in the image memory 21, a triaxial rotational angle calculation unit 24 which converts the processing results of the pattern recognition processing unit 23 to triaxial rotational angles of the photographing apparatus 2, a camera shake trajectory computation unit 25 which calculates a camera shake trajectory by arranging the triaxial rotational angles in the display order of the test patterns P1 to Pn, and the like.

The pattern recognition processing unit 23 is a program that performs well-known image processing so-called pattern matching processing or template matching processing.

Also, the triaxial rotational angle calculation unit 24 is a program that converts the moving amounts of each test pattern calculated regarding a vertical direction, a horizontal direction, and a rotational direction obtained by the pattern recognition processing unit 23 to rotational angles around the three axes of the photographing apparatus 2.

And, the camera shake trajectory computation unit 25 is a program that calculates a camera shake trajectory by arranging said three kinds of rotational angles in time series when the above still image is photographed.

Processing performed by these programs will be specifically described below with reference to the flowchart shown in FIG. 5 (see FIG. 5).

Figure 5:
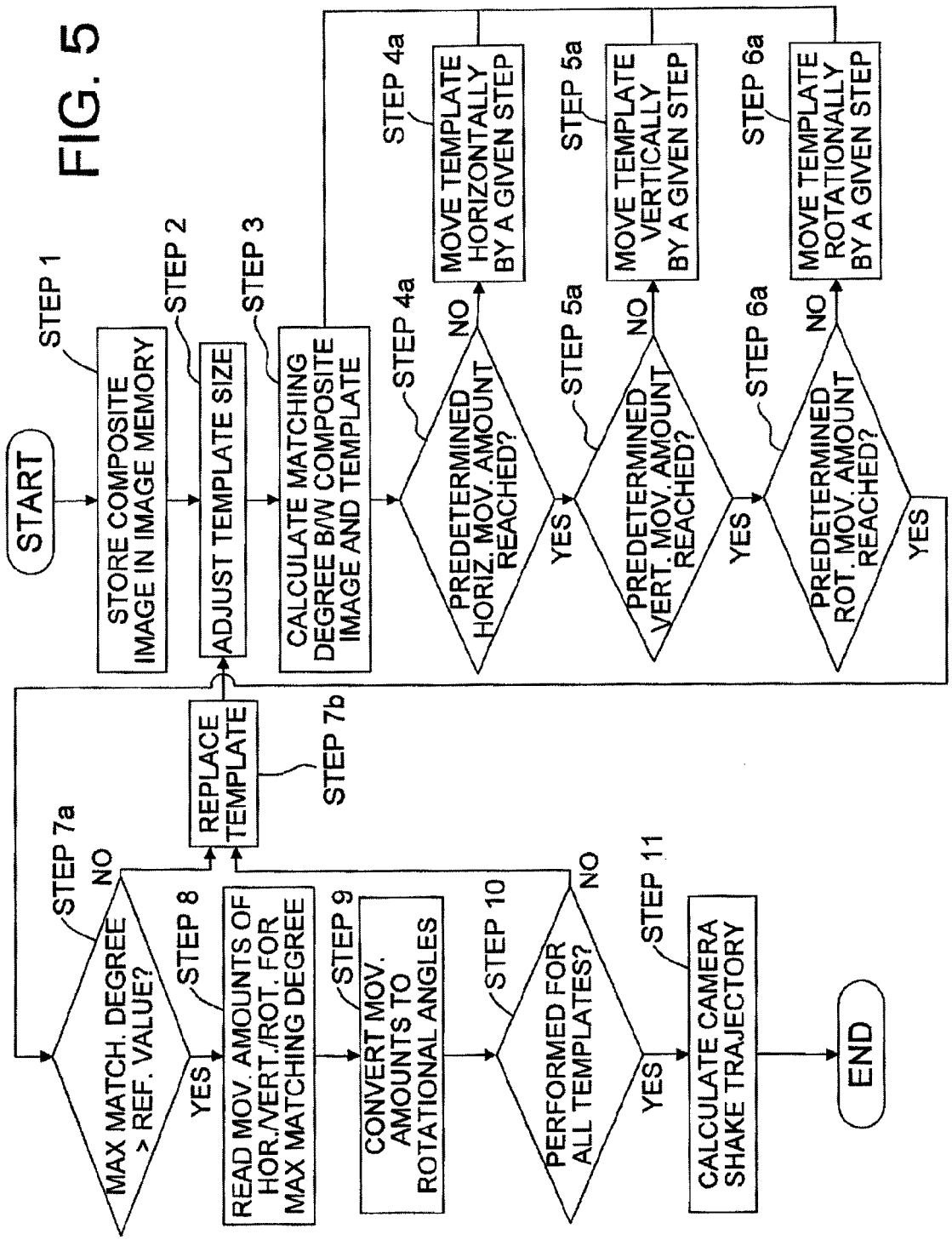
FIG. 5 is a flowchart -showing a procedure of the same camera shake measurement system.

The flowchart in FIG. 5 shows a procedure in which the arithmetic processing unit 20 processes the composite image "d".

First, in step 1 of FIG. 5, the arithmetic processing unit 20 stores the composite image "d" transmitted from the photographing apparatus 2 in the image memory 21.

Next, in step 2, the arithmetic processing unit 20 adjusts the size of the template used for pattern recognition according to the size of the composite image "d" stored in the image memory 21.

Here, the template means copies of the test patterns P1 to Pn transmitted from the test pattern display unit 10 to the image memory 22 of the arithmetic processing unit 20. And, the template moves, by predetermined steps, on a plane of the composite image "d" in the vertical, horizontal, and rotational directions when the pattern recognition is performed.

To adjust the template size, for example, the user has only to match the sizes of the reference frames "a" of the test patterns P1 to Pn stored in the image memory 22 with the sizes of the reference frames a' in the composite image "d" stored in the image memory 21.

And, in step 3, the arithmetic processing unit 20 calculates the matching degree between the reference frame "a" and point figures "b" in the template corresponding to one of the test patterns P1 to Pn and the reference frame a' and point figure b' in the composite image "d". This matching degree numerically represents the degree that the figures in the template and the figures in the composite image match each other when the template is superposed on the composite image "d".

The template first used in step 3, for example, may be the earliest-order template in the test patterns P1 to Pn.

However, another template can also be used.

Next, in step 4a, the arithmetic processing unit 20 determines whether said template has reached a predetermined horizontal moving amount. If the template has reached the predetermined horizontal moving amount, the arithmetic processing unit 20 proceeds to step 5a. If not, the arithmetic processing unit 20 proceeds to step 4b.

In step 4b, the arithmetic processing unit 20 horizontally moves said template by a given step width and returns to step 3 above described.

In step 5a, the arithmetic processing unit 20 determines whether said template has reached a predetermined vertical moving amount. If the template has reached the predetermined vertical moving amount, the arithmetic processing unit 20 proceeds to step 6a. If not, the arithmetic processing unit 20 proceeds to step 5b.

In step 5b, the arithmetic processing unit 20 vertically moves the template by a given step width and returns to step 3 above described.

In step 6a, the arithmetic processing unit 20 determines whether said template has reached a predetermined rotational moving amount. If the template has reached the predetermined rotational moving amount, the arithmetic processing unit 20 proceeds to step 7a. If not, the arithmetic processing unit 20 proceeds to step 6b.

For said rotational movement, the center thereof, for example, may be the center of the reference frame "a" that constitutes each test pattern.

In step 6b, the arithmetic processing unit 20 rotationally moves the template by a given step width and returns to step 3 above described.

That is, in step 4a to step 6b above described, the arithmetic processing unit 20 calculates the matching degree between figures in the template and figures in the composite image "d" in each case while moving or rotating, by a given step, the template corresponding to one of the test patterns Pa to Pn in the respective horizontal, vertical, and rotational directions.

Next, in step 7a, the arithmetic processing unit 20 determines whether the maximum value is at least equal to the reference value for a series of the matching degrees calculated based on the predetermined moving amount and rotation amount. If the maximum value is at least equal to the reference value, the arithmetic processing unit 20 proceeds to step 8. If the maximum value is less than the reference value, the arithmetic processing unit 20 proceeds to step 7b.

In step 7b, because the maximum value of the matching degrees is less than the reference value, the arithmetic processing unit 20 determines that figures in the template are not included in the composite figure "d", replaces said template with another template (that is, a template of the test patterns P1 to Pn that is not yet used for pattern recognition), and returns to step 2 above described.

Also, in step 8, the arithmetic processing unit 20 reads a moving amount for each moving direction when the matching degree has reached the maximum value for template where it has been determined that the maximum value of the matching degree is equal to or larger than the reference value in step 7a and proceeds to the next step 9.

In more detailed description, in the step 8, the arithmetic processing unit 20 detects a relative moving amount of the template when said matching degree has reached the maximum value to the position of said template before said template is moved for each template moving direction (horizontal, vertical, and rotational directions).

Figure 4:
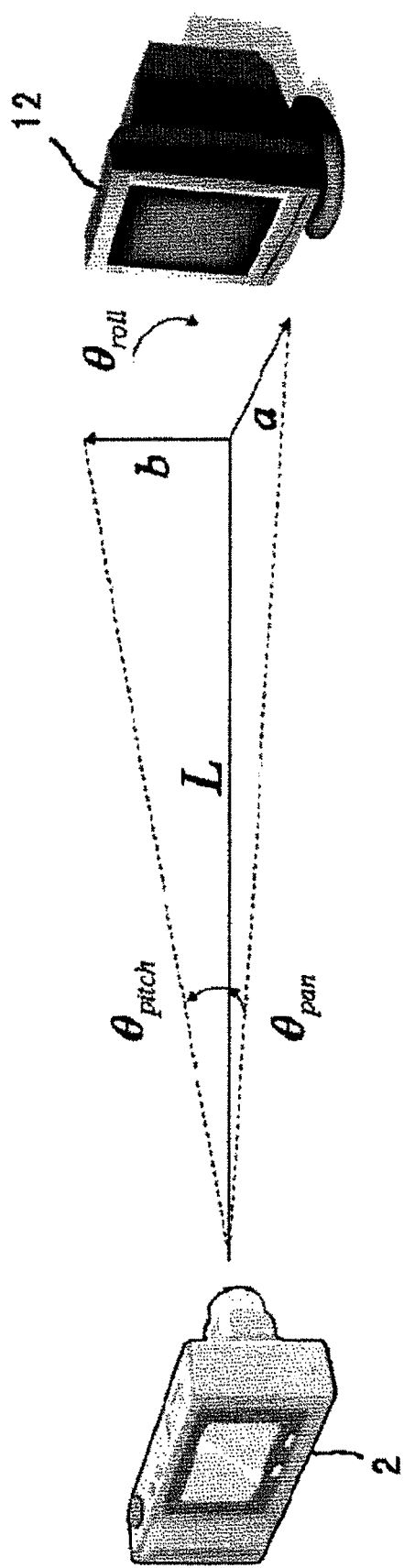
FIG. 4 is an illustration diagram showing a concept in which the same camera shake measurement system converts a moving amount for each moving direction component to a rotational angle of a still image photographing apparatus.

In step 9, the arithmetic processing unit 20 converts each of the horizontal moving amount, vertical moving amount, and rotation amount read in said step 8 to a rotational angle around the three axes of the photographing apparatus 2 based on the calculating formulas shown in FIG. 4.

In more detailed description, the numeric value obtained by dividing the horizontal moving amount "a" shown in FIG. 4 by a distance L from the display device 12 to the photographing apparatus 2 can be represented by a tangent function $\tan \theta_{pan}$ where the distance L is a base and the horizontal moving amount "a" is a perpendicular. In this tangent function, $\theta$ is minute, so a rotational angle $\theta_{pan}$ around the pan axis of the photographing apparatus 2 becomes approximately a/L from $\theta_{pan} = \tan \theta_{pan}$.

Similarly, the numeric value obtained by dividing a vertical moving amount "b" by the distance L is a tangent function tan $\theta_{pitch}$, so a rotational angle $\theta_{pitch}$ pitch around the pitch axis of the photographing apparatus 2 becomes approximately b/L.

Also, the rotational angle read in step 8 above described is used as a rotational angle $\theta_{roll}$ around the roll axis of the photographing apparatus 2 as it is.

As another example, it is also possible to calculate $\theta_{pan}$ and $\theta_{pitch}$ from an inverse function of tan $\theta_{pan}$ and an inverse function of tan $\theta_{pitch}$, respectively.

According to step 9 above described, adjusting the above distance L makes it possible to appropriately set measurement sensitivities of $\theta_{pan}$, $\theta_{pitch}$, and $\theta_{roll}$ according to the amount of camera shakes resulting from an examinee holding the photographing apparatus 2, a model of the photographing apparatus 2, or the like.

That is, if the camera shake amount is relatively small, for example, since camera shakes of the photographing apparatus 2 are reflected relatively largely in the composite image d by keeping the sizes of the reference frame a' and point figure b' on the composite image "d" approximately constant with a zoom function of the photographing apparatus 2 and lengthening the distance L (telescopic photographing state) by moving the photographing apparatus 2 away from the display device 12, measurement sensitivities can be increased.

Conversely, if the camera shake amount is relatively large, for example, since because camera shakes of the photographing apparatus 2 are reflected relatively small in the composite image "d" by keeping the sizes of the reference frame a' and point figure b' on the composite image d approximately constant with the zoom function of the photographing apparatus 2 and shortening the distance L by approaching the photographing apparatus 2 to the display device 12, measurement sensitivities can be decreased.

Next, in step 10, the arithmetic processing unit 20 determines whether step 7a above described (determines whether the maximum value of the matching degree is at least equal to the reference value) has been performed for all the templates corresponding to the test patterns PI to Pn. If this step is completed for all the templates, the arithmetic processing unit 20 proceeds to step 11. If this step is not completed for all the templates, the arithmetic processing unit 20 returns to step 7b.

In step 11, the arithmetic processing unit 20 arranges the tree rotational angles of $\theta_{pan}$, $\theta_{pitch}$, and $\theta_{roll}$ in time series when a still image is photographed by the photographing apparatus 2 to calculate the camera shake trajectory of the photographing apparatus 2, thereby terminating the processing performed by the arithmetic processing unit 20.

Figure 8:
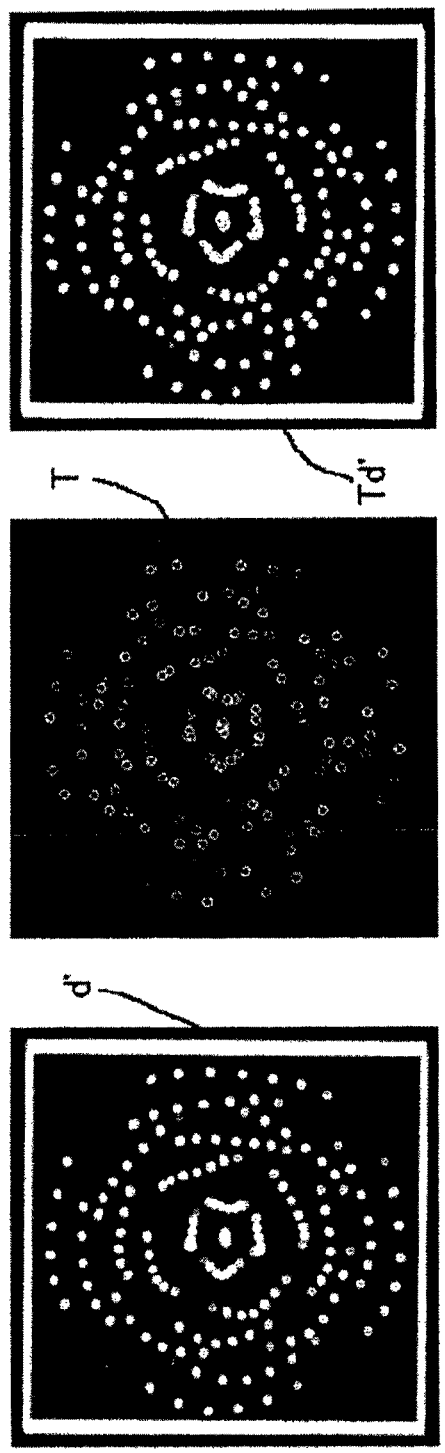
FIG. 8 is an illustration diagram showing the calculation result of camera shake trajectories detected by the same camera shake measurement system.
Figure 8:
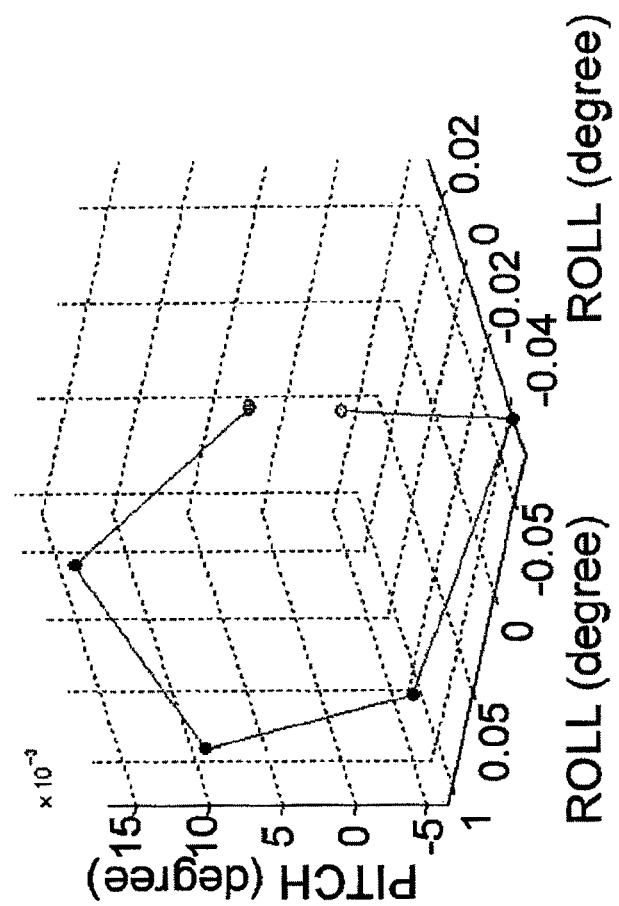

More specifically, the arithmetic processing unit 20 plots the three rotational angles of $\theta_{pan}$, $\theta_{pitch}$, and $\theta_{roll}$ for each of the test patterns P1 to Pn, for example, on the three-dimensional graph shown in FIG. 8 in the display order of the test patterns performed by the test pattern display unit 10 (time-series order when a still image is photographed) and outputs the three-dimensional graph to a display (not shown), a printer (not shown), or the like. Therefore, a camera shake trajectory of the photographing apparatus 2 is represented as a point trajectory on said three-dimensional graph.

Next, an experimental example that uses the above-mentioned camera shake measurement system will be described below.

Figure 6:
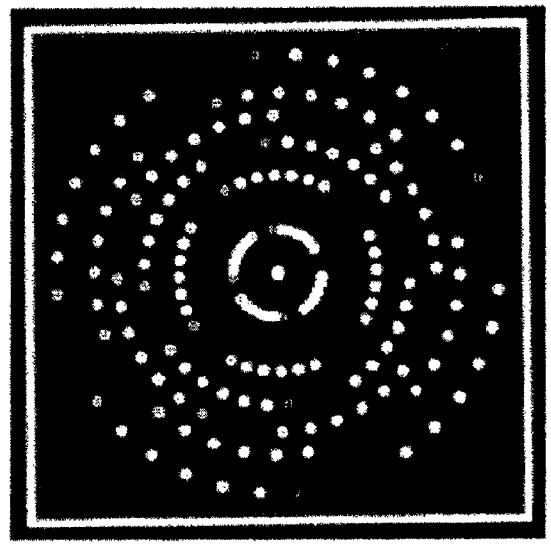
FIG. 6 is an illustration diagram showing an experimental example that specifically implements the camera shake measurement system according to the present invention.
Figure 6:
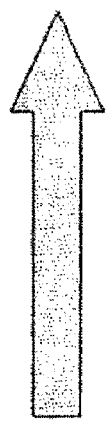
Figure 6:
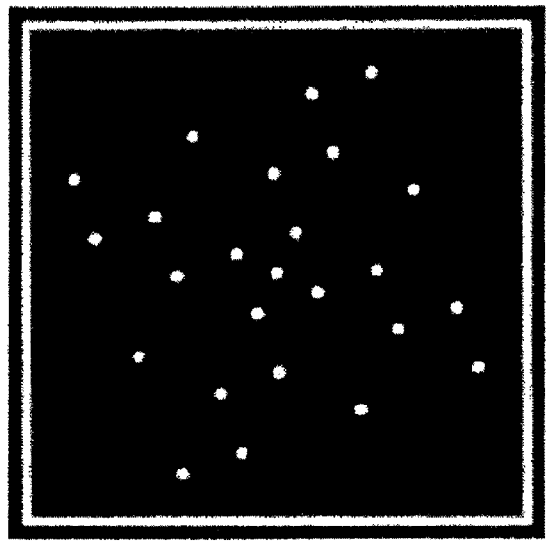

FIG. 6 shows a process that a total of nine test patterns are created by rotating, by 10 degrees, one test pattern Px configured by scattering many-point figures, a moving image where each of these nine test patterns serves as one frame is created and this moving image is displayed at a frame rate of 60 fps on the display device 12, and the displayed test patterns are photographed by the photographing apparatus 2 where the shutter speed (shutter opening time) is set to approx. 1/10 seconds to obtain a composite image d'. Therefore, six or seven test patterns of said nine test patterns are projected on the composite image d'.

One example in FIG. 6 shows the composite image d' when the photographing apparatus 2 was fixed by a tripod so as not to cause a camera shake on the photographing apparatus 2.

Figure 7:
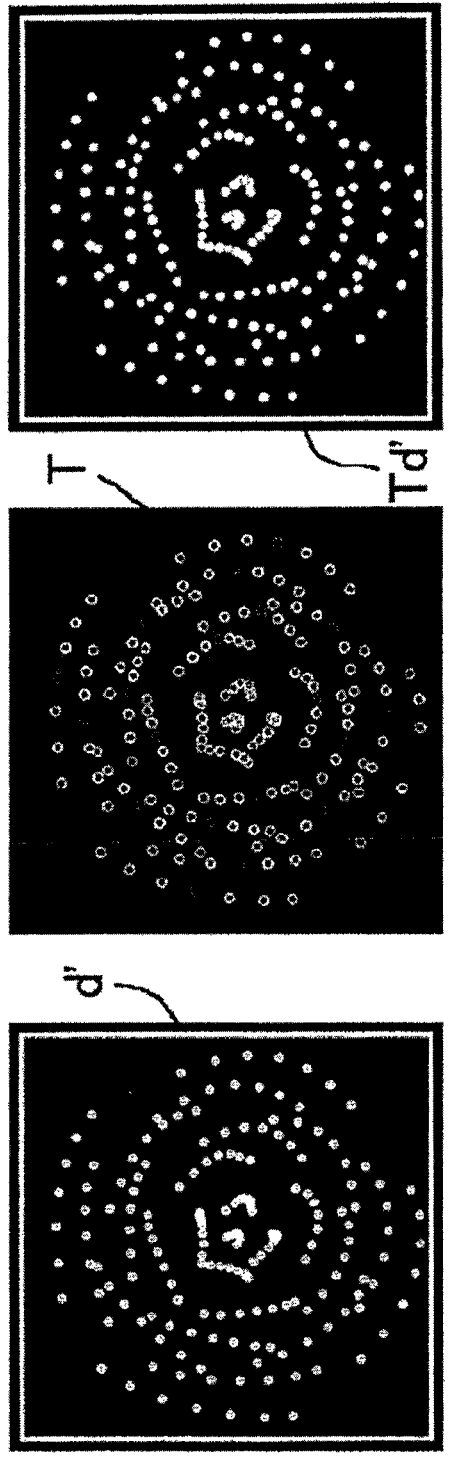
FIG. 7 is an illustration diagram showing the accuracy calculation result experimentally detected by the same camera shake measurement system.

Next, FIG. 7 shows the result photographed when the camera shake measurement system shown in FIG. 6 photographed displayed images with the photographing apparatus 2 fixed by the tripod while shifting, by a predetermined amount, nine test patterns on the display device 12 in the vertical, horizontal, and rotational directions. That is, simulation equivalent to an operation that causes a camera shake on the photographing apparatus 2 was performed.

In FIG. 7, a reference d' denotes a composite image photographed by the photographing apparatus 2.

Also, a reference T in FIG. 7 denotes a displayed image including a test pattern of the nine test patterns whose maximum value of the matching degree was equal to or larger than the reference value as a result of pattern recognition.

A reference Td' in FIG. 7 denotes an image of both d' and T superposed on each other.

As shown in the table in FIG. 7, this experiment confirmed the accuracies of ±0.1 pixel for vertical- and horizontal-direction shifting and ±0.01° for rotational-direction shifting.

Also, FIG. 8 shows the results of camera shake amount and camera shake trajectory detected by the camera shake measurement system shown in FIG. 6 while an examinee was actually holding the photographing apparatus 2 by his/her hand.

The three-dimensional graph in FIG. 8 is the rotational angle data around each axis plotted in time series on the three coordinates perpendicular to the rotational angles around the three axes (pan axis, pitch axis, roll axis) of the photographing apparatus 2. Therefore, from this graph, the user can know how camera shakes around the three axes of the photographing apparatus 2 changed in time series.

Also, FIG. 9 shows the relationship between examinees and camera shake amounts about the data measured by the camera shake measurement system shown in FIG. 6, where the upper table shows data when the camera shake correction function of the photographing apparatus 2 is OFF, while the lower table shows data when the camera shake correction function of the photographing apparatus 2 is ON.

From the comparison between the upper and lower tables in FIG. 9, it is understood that the camera shake amounts about the pitch (tilt) and pan axis are reduced to approximately ⅓ to ½ by the camera shake correction function of the photographing apparatus 2 whereas an effect of reducing the camera shake amount about the roll axis is almost never achieved.

Also, FIG. 10 shows the relationship between differences in examinee and camera shake amounts(camera shake trajectory lengths?) about the data measured by the camera shake measurement system shown in FIG. 6, where the upper table shows data when the camera shake correction function of the photographing apparatus is OFF, while the lower table shows data when the camera shake correction function of the photographing apparatus is ON.

From the comparison between the upper and lower tables in FIG. 10, it is understood that the camera shake trajectory lengths about the pitch (tilt) and pan axis are shortened by the camera shake correction function of the photographing apparatus 2 whereas an effect of shortening the camera shake trajectory length about the roll axis is almost never achieved.

The comparison results of the upper and lower tables shown in FIG. 9 and FIG. 10 are attributed to the fact that the photographing apparatus 2 is a commercially-available digital camera and is not equipped with a function that corrects camera shakes around the roll axis.

Also, FIG. 11 and FIG. 12 show the relationship (FIG. 11) between differences in photographing apparatus 2 models and camera shake amounts about the data measured by the camera shake measurement system shown in FIG. 6 and the relationship (FIG. 12) between differences in photographing apparatus 2 models and camera shake trajectory lengths about the data measured by the camera shake measurement system shown in FIG. 6, where the upper table shows data when the camera shake correction function is OFF, while the lower table shows data when the camera shake correction function is ON.

From the tables in FIG. 11 and FIG. 12, it is understood that differences in camera shake correction capabilities result from differences in photographing apparatus 2 models.

According to the configuration described above, the photographing apparatus 2 is a commercially-available digital camera with a camera shake correction function. However, as another example, this photographing apparatus 2 may be a digital camera having no camera shake correction function or a video camera that uses the still image photographing function. Furthermore, one frame (still image) of the moving image photographed by the video camera may be used as the above composite image "d" (or d').

The test pattern display unit 10 is not limited to the above aspects, and, for example, the above test patterns P1 to Pn may be sequentially displayed by blinking many LEDs. According to this configuration, an LED response speed is generally faster than a liquid crystal display speed, so measurement resolution can be improved by making the switching speed of the test patterns P1 to Pn much faster.

Such a configuration can also be adopted such that a high-speed switching of the above test patterns P1 to Pn is apparently performed by moving or rotating the test patterns P1 to Pn utilizing a mechanical means.

In addition, the above test pattern P1 is not limited to a pattern to be displayed on a plane, but it may be a pattern that spreads in a depth direction (a pattern to be planarly configured by LEDs disposed in space).

According to the above embodiment, such a configuration is adopted that the arithmetic processing unit 20 calculates rotational angles around the three axes of the photographing apparatus 2, but, as a more simplified configuration, such a configuration can be adopted that the triaxial rotational angle calculation unit 24 is omitted and a camera shake trajectory is calculated by using the moving directions and moving amounts of respective templates detected during pattern recognition by the pattern recognition processing unit 23 as the values corresponding to the camera shakes of the photographing apparatus 2 as they are to arrange the moving directions and moving amounts in time series.

Also, according to the above embodiment, defining a plurality of test patterns P1 to Pn as different figures having non-superposed portions on one another makes it easy to recognize each test pattern after camera shake movement from the composite image "d", but, as another example, it is also possible to recognize each test patter after camera shake movement from the composite image "d" by defining the test patterns P1 to Pn as figures of different colors, respectively, and using the color information.

In addition, the above embodiment shows one example of configuring the test pattern display unit 10 and the arithmetic processing unit 20 using computers different from each other, but it is also possible to configure these test pattern display unit 10 using the same computer or three or more computers.

Furthermore, a portion or all of the above test pattern generator 11a, pattern recognition processing unit 23, triaxial rotational angle calculation unit 24, and camera shake trajectory computation unit 25 can be used as a computer-readable recording medium recorded as a program.

Also, according to the above embodiment, the camera shake measurement system and camera shake measurement method of the present invention are inventions related to camera shake measurement of the photographing apparatus 2, but the principle thereof is applicable not only to camera shake measurement of the photographing apparatus 2 but also to various vibration measurements and image analyses that cannot be observed (followed) at an imaging frame rate in moving image photographing or consecutive still image photographing performed by a normal photographing apparatus, or the like, because they are too fast.

DESCRIPTION OF REFERENCE NUMERALS

1: Camera shake measurement system
2: Photographing apparatus
10: Test pattern display unit (display means)
20: Arithmetic processing unit
21: Image memory (second storage means)
22: Image memory (first storage means)
23: Pattern recognition processing unit (pattern recognition means)
P1 to Pn, and Px: Test patterns
a, a': Reference frame
b, b': Point figure
c: Subject
d, d': Composite image

What is claimed is:

1. A camera shake measurement system comprising:
a display unit for sequentially displaying a plurality of distinguishable test patterns;
a first storage unit for storing a template each of said plurality of test patterns to be displayed;
a second storage unit for storing a composite image produced by photographing at least two test patterns as still images from said plurality of test patterns to be sequentially displayed by a photographing apparatus; and
a pattern recognition unit for recognizing images that match each of the templates from the composite image by calling said templates from said first storage unit, calling said composite image from said second storage unit, and moving, for each of the called templates, the template while superposing the template on said composite image, wherein
a moving direction and a moving amount of each of the templates obtained by said pattern recognition unit are defined respectively as a camera shake direction and a camera shake amount of said photographing apparatus, and said still image is photographed and at least two sets of the camera shake direction and the camera shake amount are obtained.

2. The camera shake measurement system according to claim 1, wherein each of said plurality of test patterns is a figure including portions that are not substantially superposed on each other between the test patterns.

3. The camera shake measurement system according to claim 2, wherein
said moving direction comprises a vertical direction, a horizontal direction, and a rotational direction on a plane of said composite image, and
the above moving amount is detected for each direction.

4. The camera shake measurement system according to claim 3, wherein the moving amount of said vertical direction, the moving amount of said horizontal direction, and the moving amount of said rotational direction are converted respectively to a camera shake amount around a pitch axis, a camera shake amount around a pan axis, and a camera shake amount around a roll axis for said photographing apparatus.

5. The camera shake measurement system according to claim 4, wherein said three camera shake amounts are arranged in the display order of said test patterns to calculate a camera shake trajectory.

6. The camera shake measurement system according to claim 5, wherein each of said test patterns is at least two figures to be planarly displayed.

7. The camera shake measurement system according to claim 1, wherein said moving direction and said moving amount are arranged in the display order of said test patterns to calculate a camera shake trajectory of the photographing apparatus.

8. The camera shake measurement system according to claim 1, wherein
said moving direction comprises a vertical direction, a horizontal direction, and a rotational direction on a plane of said composite image, and
the above moving amount is detected for each direction.

9. The camera shake measurement system according to claim 1,
wherein said moving direction comprises a vertical direction, a horizontal direction, and a rotational direction on a plane of said composite image, and said moving amount is detected for each direction, and the moving amount of said vertical direction, the moving amount of said horizontal direction, and the moving amount of said rotational direction are converted respectively to a camera shake amount around a pitch axis, a camera shake amount around a pan axis, and a camera shake amount around a roll axis for said photographing apparatus.

10. The camera shake measurement system according to claim 1, wherein each of said test patterns comprises at least two figures to be planarly displayed.

11. A camera shake measurement system comprising:
a first storage unit for storing as a template each of a plurality of distinguishable test patterns;
a second storage unit for storing a composite image produced by photographing at least two test patterns of said plurality of test patterns to be sequentially displayed as still images by a photographing apparatus; and
a pattern recognition unit for recognizing an image that matches each of said templates from said composite image by calling said templates from said first storage unit, calling said composite image from said second storage unit, and moving, for each of said called templates, the template while superposing the template on said composite image,
wherein a moving direction and a moving amount of each of said templates obtained by said pattern recognition unit are defined as a camera shake direction and a camera shake amount of said photographing apparatus and at least two sets of the camera shake direction and the camera shake amount are obtained.

12. A camera shake measurement method comprising:
displaying a plurality of distinguishable test patterns sequentially;
storing as a template each of said plurality of test patterns to be displayed ;
storing a composite image produced by photographing at least two test patterns of said test patterns as still images by a photographing apparatus; and
recognizing images that match each of said templates from said composite image by calling said templates, calling said composite image, and moving, for each of said called templates, the template while superposing the template on the composite image, wherein
a moving direction and a moving amount of each of said templates are defined as a camera shake direction and a camera shake amount of said photographing apparatus and at least two sets of the camera shake direction and the camera shake amount are obtained.

* * * * *